Dec. 28, 1954  G. AGINS  2,698,134
ELECTRIC COMPUTER
Filed Aug. 27, 1940  3 Sheets-Sheet 1

INVENTOR
GEORGE AGINS
BY
ATTORNEYS

Dec. 28, 1954     G. AGINS     2,698,134
ELECTRIC COMPUTER
Filed Aug. 27, 1940     3 Sheets-Sheet 2
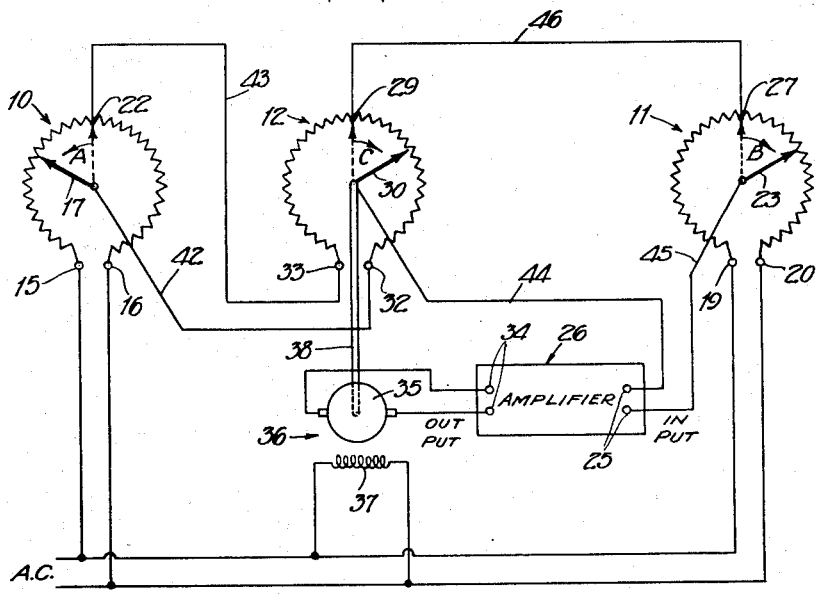
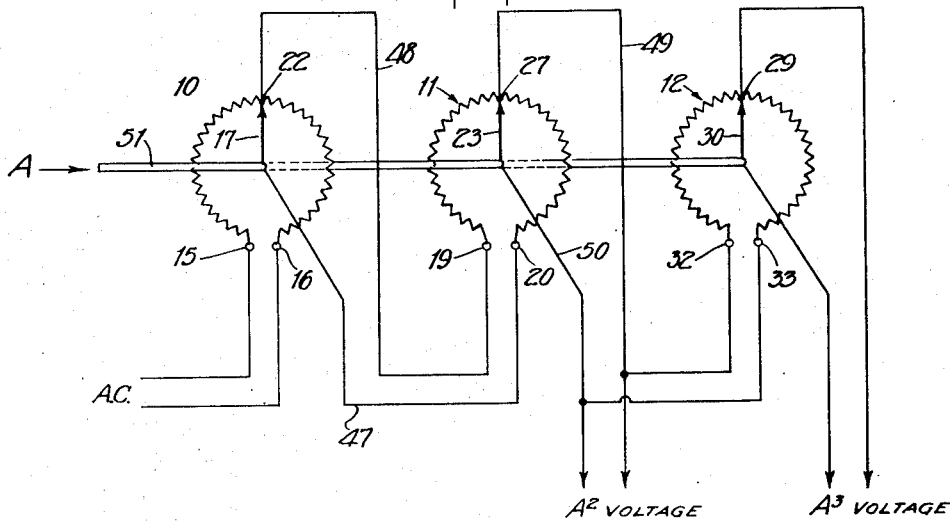
INVENTOR
GEORGE AGINS
BY
*Hoguet, Neary & Campbell*
ATTORNEYS Dec. 28, 1954  G. AGINS  2,698,134
ELECTRIC COMPUTER
Filed Aug. 27, 1940  3 Sheets-Sheet 3

ELECTRIC SUPPLY

VOLTAGE

ANGULAR DISPLACEMENT

INVENTOR
GEORGE AGINS
BY
ATTORNEYS

United States Patent Office 2,698,134
Patented Dec. 28, 1954

2,698,134

ELECTRIC COMPUTER

George Agins, Brooklyn, N. Y., assignor to American Bosch Arma Corporation, a corporation of New York Application August 27, 1940, Serial No. 354,371

5 Claims. (Cl. 235—61)

This invention relates to computers and has particular reference to electrically-operated computers for continuously obtaining voltages proportional to algebraic products, quotients, of variable or changing quantities, voltages proportional to trigonometric functions of variable or changing angles, displacements proportional to such voltages, and the like.

In accordance with the invention, two or more potentiometers, each having a movable brush or contact, whose displacement from a neutral or zero position is proportional to the voltage output thereof, are so connected electrically in series or in opposition that the resultant voltage output is proportional to the product or quotient of the input values corresponding to the displacement of the several movable contacts, or proportional to a trigonometric function of the angle of displacement of the movable contact, and in either case the output voltage may be impressed on a motor for obtaining a displacement in accordance with or proportional to the output voltage of the potentiometer system.

It will be seen that with the electric computer of this invention, calculations may be instantaneously and accurately made from variable or changing input quantities in the form of continuous output voltages or movements available for use as electric or mechanical inputs to additional calculating devices, or for proportionately actuating indicators of the output quantities, follow-up mechanism, and the like, in gun fire control equipment or other calculating means requiring great accuracy over extended periods of time.

For a more complete understanding of the invention, reference may be had to the accompanying drawings, in which:

Fig. 3 illustrates diagrammatically another form of computer of this invention for continuously obtaining an angular displacement proportional to the algebraic quotient of two variable or changing quantities;

Fig. 4 illustrates diagrammatically another form of computer of this invention for continuously obtaining a voltage proportional to the square or cube of a variable or changing quantity;

Fig. 7 illustrates diagrammatically the curve characteristic of the electric cam of Fig. 6.

Figure 1:
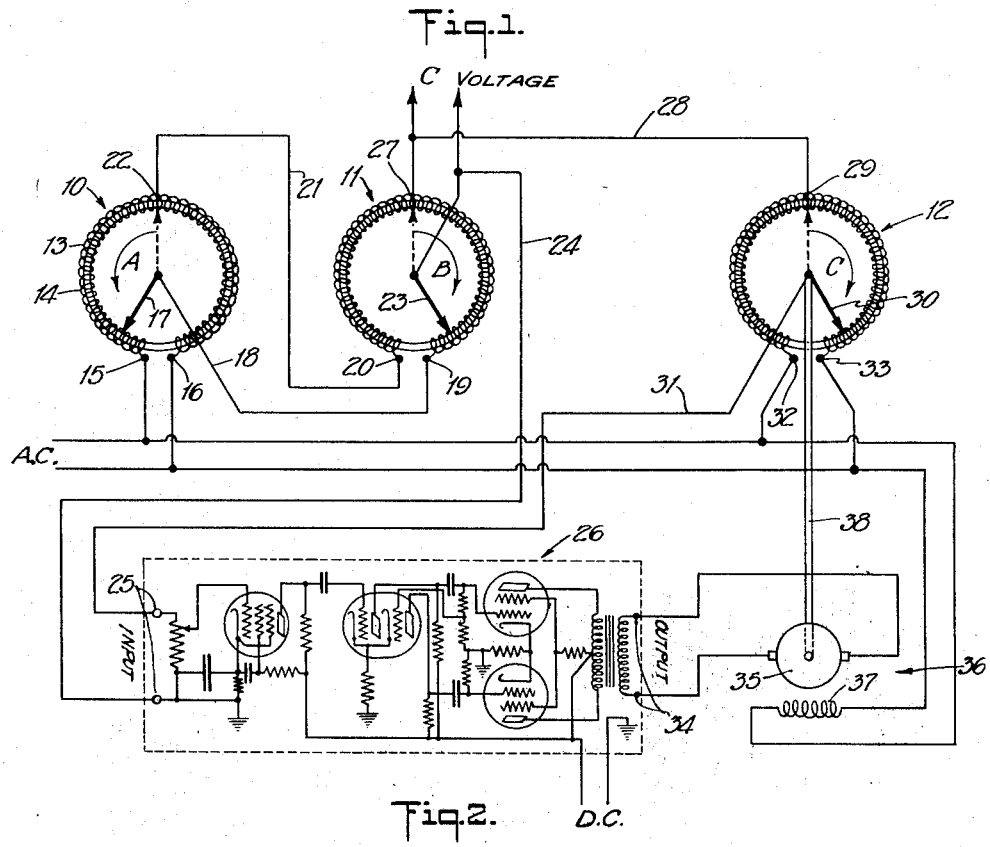
Figure 1 illustrates diagrammatically one form of electric computer of this invention whereby a voltage proportional to the algebraic product of two variable or changing quantities may be obtained, and also an angular displacement proportional to the product voltage.
Figure 2:
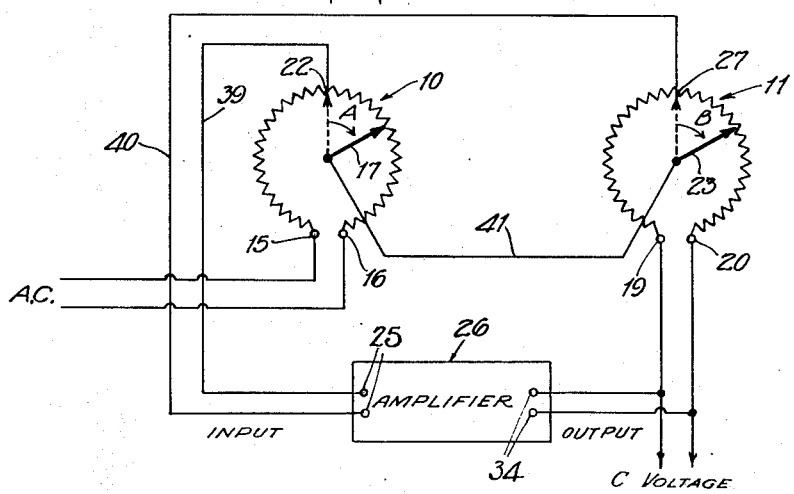
Fig. 2 illustrates diagrammatically another form of computer of this invention for continuously obtaining a voltage proportional to the algebraic quotient of two variable or changing quantities.

Referring to Fig. 1, numerals 10, 11 and 12 designate three potentiometers, which may be of the auto-transformer type, as shown in this figure, or of the resistance type shown in Figs. 2, 3 and 4, both types being well-known in the art. The end taps 15 and 16 of potentiometer 10 are connected to a source of constant alternating current. A movable brush or contact 17 engaging the helix 14 of potentiometer 10 is connected by wire 18 to one end tap 19 of potentiometer 11, whose other end tap 20 is connected by wire 21 to the center tap 22 of potentiometer 10, as shown.

With constant voltage applied to the end taps of potentiometer 10, the voltage across movable contact 17 and center tap 22 is always directly proportional to the angular displacement of the movable contact 17 from the center tap 22, and the phase of the output voltage of potentiometer 10 with respect to the source is determined by the direction of the angular displacement of the movable contact 17 from center tap 22. The other potentiometers 11 and 12 have the same characteristics, as will be indicated.

The movable contact 23 of potentiometer 11 is connected by wire 24 to one of the input terminals 25 of the electronic amplifier 26 which is of conventional construction, such as that illustrated in the diagram, which is self-explanatory. The particular amplifier 26 forms no part of the present invention, and any equivalent arrangement will serve the purpose.

The center tap 27 of potentiometer 11 is connected by wire 28 to the center tap 29 of potentiometer 12, whose movable brush 30 is connected by wire 31 to the other input terminal 25 of amplifier 26, and whose end taps 32 and 33 are connected to the constant alternating current source.

The output terminals 34 of the amplifier 26 are connected to the armature 35 of the shunt wound type alternating current motor 36, whose field winding 37 is energized from the constant alternating current source. The armature 35 of motor 36 is operatively connected by shaft 38 to movable contact 30 of potentiometer 12 for driving the same.

It will be observed that with the circuit connections shown in Fig. 1, the output terminals of the potentiometer 12, namely, movable contact 30 and center tap 29, are in series opposition to the output terminals 23 and 27 of potentiometer 11 and in series with the input terminals 25 of the amplifier 26.

In operation of the arrangement of Fig. 1 with given inputs of A and B, which may be fixed or variable quantities, the movable contact 17 of potentiometer 10 is so positioned from its neutral or zero position coincident with center tap 22 that the angular displacement thereof from center tap 22 corresponds to the input quantity A. Movable contact 23 of potentiometer 11 is so positioned from its neutral or zero position coincident with center tap 27 that the angular displacement thereof from center tap 22 cormresponds to the input quantity B. Inasmuch as the voltage across the movable contacts 17 and 23 and their respective center taps 22 and 27 is directly proportional to the angular displacements of these movable contacts from their center taps, with the direction of their displacements from their center taps depending on the algebraic sign of the corresponding inputs, and as the voltage output of potentiometer 10 is superimposed as input on the potentiometer 11, it follows that the output voltage C of the potentiometer 11 measured across the center tap 27 and movable contact 23 is proportional to the algebraic product of the input quantities A and B. This product voltage may be utilized as input to additional calculating apparatus, for actuating an indicator, follow-up, or the like.

For example, if it is desired to obtain an angular displacement proportional to voltage C, such as a member for indicating the quantity C, or as angular input of the quantity C into a calculator, the potentiometer 12 may be used in conjunction with electronic amplifier 26 and motor 36. Inasmuch as the voltage applied to the input terminals 25 of the amplifier 26 is always equal to the difference between the output voltages of potentiometers 11 and 12, the motor 36 drives movable contact 30 of potentiometer 12 to the position and in the direction where the input voltage applied to the amplifier 26 becomes zero and the motor 36 is accordingly deenergized. This occurs as follows: The previous calculation has left the brush 30 of the potentiometer 12 in some position of balance so that, although current is flowing in the field winding 37 of motor 36, no current is flowing in the armature 35. The motor is therefore at rest. Now, a new calculation is to be made and the brushes 17 and 23, for the values A and B, respectively, are moved to some new location, say those shown in Fig. 1. By this means a voltage proportional to the product AB is applied across the brush 30 and the center tap 29 of potentiometer 12. There is, however, a voltage already existing across these points, due to the position in which the brush 30 was left on the potentiometer winding 12, at the end of the previous calculation. The difference between these two voltages actuates the amplifier 26 which in turn feeds current from its output at 34 to the armature 35 of the motor 36, causing the motor to run. The direction in which the armature will turn is determined in the same manner as though direct currents were flowing in the motor circuits, instead of the alternating currents (of like frequency) which are preferred. With the use of alternating current from the A. C. source in Fig. 1 to feed the motor field winding 37, this winding produces an alternating magnetic field which threads the armature 35 at all times. This field drives the motor whenever there is current in the armature 35 and the direction in which the armature turns is determined by the alternating field about the armature. If the alternating current in armature 35 is in phase with the alternating current in field winding 37, the armature rotates in a certain direction; if the alternating current in armature 35 is in opposite phase to the alternating current in field winding 37, then the armature rotates in the opposite direction. That is to say that the directional tendency of rotation of armature 35, at any instant, is determined by the instantaneous flow of current in the armature relative to the instantaneous direction of flow of current in the field winding. Since, whenever the current direction in the field changes, the direction of the current in the armature changes also, being fed from the same A. C. source, such frequency changes may be ignored and the circuits considered as though carrying direct current. And, finally, as in direct current, transfer of a brush across a center tap on a potentiometer reverses the output when A. C. is used, the instantaneous direction of the output from the brush and mid-point potentiometer connection being effective.

Thus, the voltage across movable contact 30 and center tap 29 of potentiometer 12 is equal to the output voltage of potentiometer 11, and as the output voltage of potentiometer 11 is the product voltage C, it follows that the angular displacement of movable contact 30 from center tap 29 of potentiometer 12 is directly proportional to the product voltage C, and the direction of its displacement from center tap 29 corresponds to the algebraic sign of the product AB.

Referring to the arrangement of Fig. 2, the potentiometer 10 has its end taps 15 and 16 connected to the constant alternating current source as before, but its center tap 22 is connected by wire 39 to one of the input terminals 25 of the electronic amplifier 26, which is of the high gain type such as that illustrated in Fig. 1. The other input terminal to amplifier 26 is connected by wire 40 to the center tap 27 of potentiometer 11, whose movable contact 23 is connected by wire 41 to movable contact 17 of potentiometer 10. The end taps 19 and 20 of potentiometer 11 are connected to the output terminals 34 of the amplifier 26. It will be observed that with these connections the output terminals 17 and 22 of potentiometer 10 are connected in series opposition to the output terminals of potentiometer 11, and in series with the input terminals 25 of amplifier 26.

In operation of the arrangement of Fig. 2, where it is desired to obtain a voltage proportional to the algebraic quotient of two variable changing quantities A and B, the movable contact 17 of potentiometer 10 is so positioned from its neutral or zero position coincident with center tap 22 that the angular displacement thereof from its center tap 22 corresponds to the value of the dividend input quantity A, and the movable contact 23 of potentiometer 11 is so positioned from its zero or neutral position coincident with center tap 27 that the angular displacement thereof from its center tap 27 corresponds to the divisor input quantity B, the direction of displacement of the movable contacts 17 and 23 from their corresponding center taps 22 and 27 conforming to the algebraic signs of the respective input quantities A and B.

Inasmuch as the voltage output of potentiometer 10 is proportional to the displacement of movable contact 17 from center tap 22, this output may be called A voltage, and the output voltage of potentiometer 11 is the BC product voltage, C being the output voltage of the amplifier 26. The input voltage applied to the amplifier 26 is equal to the difference between the A voltage output of potentiometer 10 and the BC output voltage of potentiometer 11. Hence, when the output voltage A of potentiometer 10 is equal to output voltage BC of potentiometer 11, the input voltage to the amplifier 26 will be zero. However, inasmuch as only a minutely small input to the high gain amplifier 26 is necessary in order to obtain the requisite output voltage therefrom, the product BC voltage differs only slightly from the A voltage, so that error in the value of the BC product voltage is of negligible magnitude, and this error approaches zero as the gain of the amplifier is increased.

Inasmuch as voltage BC=voltage A, $$\text{Voltage } C = \frac{\text{voltage } A}{\text{voltage } B}$$

Hence C, which is the output voltage of the amplifier 26, is proportional to the algebraic quotient of the dividend A and the divisor B, where A and B are variable or changing quantities represented by respective angular input displacements of the movable contacts 17 and 23 of corresponding potentiometers 10 and 11. Accordingly, the arrangement of Fig. 2 may be advantageously utilized in gun fire control equipment, for example, for obtaining a voltage proportional to the algebraic quotient of two variable and changing input angles involving the changing position of a moving target, or the like, and the output voltage C may be impressed on a motor, similar to motor 35 in Fig. 1, for example, for displacing an indicator for indicating the aforementioned algebraic quotient.

In the arrangement of Fig. 3, the ends taps 15 and 16 of potentiometer 10 and the end taps 19 and 20 of potentiometer 11 are connected to the constant alternating current source, as shown. Movable contact 17 and center tap 22 of potentiometer 10, the output terminals thereof, are connected by respective wires 42 and 43 to end taps 32 and 33 of potentiometer 12, the input terminals thereof. Movable contact 30 of potentiometer 12 is directly connected by wire 44 to one of the input terminals 25 of the electronic amplifier 26, whose other input terminal 25 is connected by wire 45 to movable contact 23 of potentiometer 11. The respective center taps 27 and 29 of potentiometers 11 and 12 are connected together by wire 46.

The output terminals 23 and 27 are accordingly connected in series opposition to the output terminals 29 and 30 of potentiometer 12, and in series with the input terminals 25 of amplifier 26. The output terminals 34 of amplifier 26 are connected to the armature 35 of shunt wound motor 36 operatively connected by shaft 38 to movable contact 30 of potentiometer 12 for driving the same. The field winding 37 of motor 36 is energized from the alternating current source, as shown.

In operation of the arrangement of Fig. 3, when it is desired to continuously obtain an angular displacement proportional to the algebraic quotient of two variable or changing quantities A and B, the movable contact 17 of potentiometer 10 is so positioned that its angular displacement from its neutral or zero position coincident with center tap 22 corresponds to the value of the divisor A, and the movable contact 23 of potentiometer 11 is so positioned that its angular displacement from its neutral or zero position coincident with center tap 27 corresponds to the value of the dividend B. The directions of these displacements of movable contacts 17 and 23 from their zero positions conform to the algebraic signs of the respective input quantities A and B.

In view of the input to potentiometer 12 of the output voltage A of potentiometer 10, the output of potentiometer 12 is the product AC voltage, and the output of potentiometer 11 is B voltage. The net voltage of these opposed outputs is impressed on the amplifier 26 and results in rotation of the movable contact 30 of potentiometer 12 by motor 36 to a position displaced from center tap 29 by an amount such that the AC product voltage output of potentiometer 12 is equal to the B voltage output of potentiometer 11. The input to amplifier 26 accordingly becomes zero and the motor 36 is deenergized.

Inasmuch as voltage AC=voltage B, it follows that $$\text{Voltage } C = \frac{\text{voltage } B}{\text{voltage } A}$$

and the angular displacement of movable contact 30 of potentiometer 12 from its zero position coincident with center tap 29 is proportional to the algebraic quotient of dividend B and divisor A, where A and B are variable input quantities represented by the angular displacements of respective movable contacts 17 and 23 of corresponding potentiometers 10 and 11. These input quantities may be fixed for any given period of time, or they may be variable and the displacement of the armature 35 of motor 36 will vary proportionately and this movement may be utilized for driving a calculator, and indicative of the value C or equivalent thereof, or for actuating a follow-up mechanism, or the like.

In the arrangement of Fig. 4, the outputs of the several potentiometers 10, 11 and 12 are impressed as inputs on succeeding potentiometers for continuously obtaining a voltage which is proportional to the algebraic square or cube of a variable or changing quantity. As illustrated, the input terminals 15 and 16 of potentiometer 10 are connected to the constant alternating current source, and the movable contact 17 and center tap 22 thereof are connected by respective wires 47 and 48 to the input terminals 19 and 20 of potentiometer 11. The output terminals of potentiometer 11, namely, movable contact 23 and center tap 27, are connected by respective wires 49 and 50 to the input terminals 32 and 33 of potentiometer 12.

The movable contacts 17, 23 and 30 of respective potentiometers 10, 11 and 12 are driven by a common input shaft 51, so that rotation of the latter results in equal angular displacements of these movable contacts 17, 23 and 30 from their respective zero or neutral positions coincident with center taps 22, 27 and 29, respectively.

In operation of the arrangement of Fig. 4, the shaft 51 is positioned so that each of the movable contacts 17, 23 and 30 of the potentiometers 10, 11 and 12 is displaced from its zero position through an angle corresponding to the value of quantity A in magnitude and sign. The output voltage A of potentiometer 10 is applied to and hence is multiplied by the voltage A of potentiometer 11, so that the output of the latter across movable contact 23 and center tap 27 is proportional to $A^2$, as indicated in Fig. 4. Likewise, the voltage $A^2$ is applied to and hence is multiplied by the voltage A of potentiometer 12, so that the output of the latter across movable contact 30 and center tap 29 is $A^3$, as indicated in Fig. 4. In the same way, by adding other potentiometers connected together in the same way, output voltages proportional to $A^4$, $A^5$, to $A^n$ may be obtained, with the polarities of the output voltages with respect to the polarity of the source voltage conforming to the correct algebraic signs. The output voltages may be used directly as voltage inputs of corresponding values to an electric calculator, or may be impressed on a motor for obtaining a corresponding displacement to indicate the quantity, or drive additional calculating mechanism, or the like.

Figures 2, 5, 6:
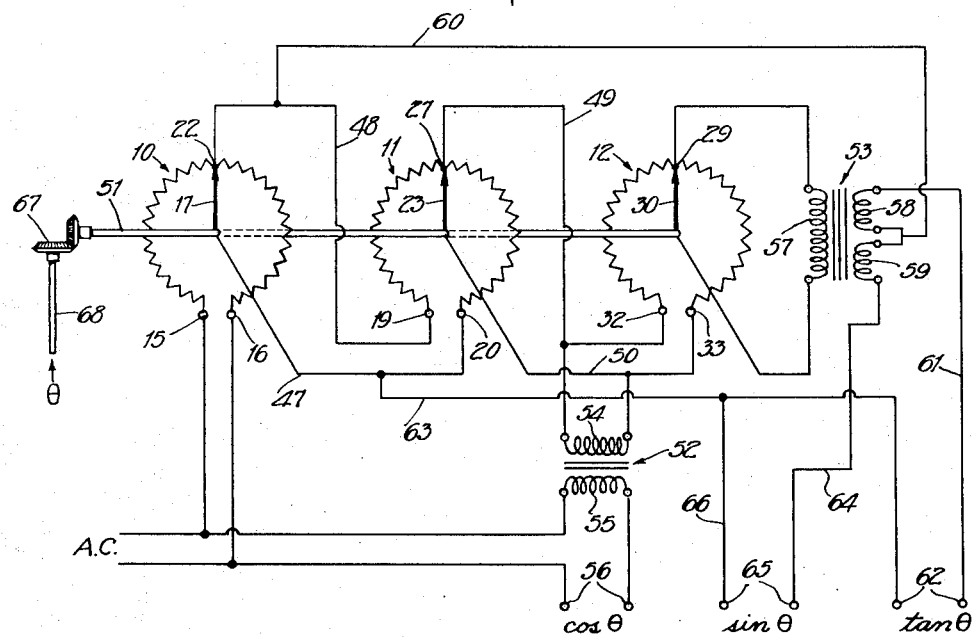
Fig. 5 illustrates diagrammatically a form of computer of this invention for continuously obtaining voltages proportional to trigonometric functions of a variable or changing angle.
Fig. 6 illustrates diagrammatically a modified form of potentiometer utilized as an electric cam in accordance with this invention.

The arrangement of Fig. 5, which is a modification of that of Fig. 4, may be utilized for continuously obtaining the sine, cosine and tangent functions of a given angle, $\theta$, which may be variable or changeable. These trigonometric functions are the following approximations obtained from the first two terms of the well-known trigonometric series:

$$\sin \theta = \theta - \frac{\theta^3}{6}$$

$$\cos \theta = 1 - \frac{\theta^2}{2}$$

and $$\tan \theta = \theta + \frac{\theta^3}{3}$$

which are substantially accurate and can be used with facility for small angles up to 30°.

As in Fig. 4, the output of potentiometer 10 is impressed as input on potentiometer 11, and the output of the latter is impressed as input on potentiometer 12, like reference characters in Fig. 5 identifying the same parts as in Fig. 4.

In addition to the parts of Fig. 4, the arrangement of Fig. 5 includes two transformers 52 and 53. The primary winding 54 of transformer 52 is connected to wires 49 and 50 so that it is in parallel with the output terminals 23, 27 of potentiometer 11, and the secondary winding 55 is connected in series opposition to the constant alternating current source, and in series with the terminals 56. The primary winding 57 of transformer 53 is connected to the output terminals 29 and 30 of potentiometer 12, and the midpoint between its two secondary windings 58 and 59 is connected by wire 60 to wire 48. The other terminal of secondary winding 58 is connected by wire 61 to one of the terminals 62, the other of which is connected by wire 63 to wire 47. The other terminal of secondary winding 59 is connected by wire 64 to one of the terminals 65, the other of which is connected by wire 66 to wire 63.

It will be observed that with these connections, secondary winding 58 of transformer 53 is connected in series with the output terminals 17, 22 of potentiometer 10 and also in series with terminals 62, whereas secondary winding 59 is connected in series opposition to the output terminals 17, 22 of potentiometer 10 and in series with the terminals 65.

In operation of the arrangement of Fig. 5, the input shaft 51 is positioned directly or through gearing 67 by shaft 68, so that the movable contacts 17, 23 and 30 of respective potentiometers 10, 11 and 12 are displaced from their zero or neutral positions coincident with corresponding center taps 22, 27 and 29 by an amount corresponding to the input angle $\theta$. The gear 67 ratio may be one-to-one or it may be one-to-five, or the like, in order to obtain any desired ratio of displacement of movable contacts 17, 23 and 30 to input displacement.

Inasmuch as the voltage across movable contact 17 and center tap 22 is directly proportional to the displacement of the former from the latter, the output voltage of potentiometer 10 is proportional to $\theta$, which, multiplied by the voltage $\theta$ of potentiometer 11, results in a voltage output of the latter across its terminals 23, 27 proportional to $\theta^2$. The primary winding 54 of transformer 52, being connected in parallel with these output terminals 23, 27 of potentiometer 11, is accordingly energized by the output voltage thereof, which is proportional to $\theta^2$. The ratio of voltage transformation of transformer 52 is such that the voltage across the terminals 56, in series with secondary winding 55, is proportional to $$1 - \frac{\theta^2}{2}$$

which is the approximation of $\cos \theta$, according to the aforementioned formula.

Similarly, the output voltage $\theta^2$ of potentiometer 11 multiplied by the voltage $\theta$ of potentiometer 12 results in an output voltage across its terminal 29, 30 proportional to $\theta^3$. Inasmuch as the primary winding 57 of transformer 53 is connected in parallel with these output terminals 29, 30 of potentiometer 12, it likewise is energized by the output voltage thereof, which is proportional to $\theta^3$. The ratio of voltage transformation of transformer 53 at secondary winding 58 is such that the voltage across terminals 62 is proportional to $$\theta + \frac{\theta^3}{3}$$

since secondary winding 58 is in series with the output terminals 17, 22 of potentiometer 10. Inasmuch as $$\theta + \frac{\theta^3}{3}$$

is the approximation of $\tan \theta$, according to the aforementioned formula, the voltage across terminals 62 is proportional to $\tan \theta$, as indicated in Fig. 5.

By reason of the ratio of voltage transformation of transformer 53 at secondary winding 59, and the series opposition connection of secondary winding 59 to the output terminals 17, 22 of potentiometer 10, the voltage across terminals 65 is proportional to $$\theta - \frac{\theta^3}{6}$$

which is the approximation of $\sin \theta$ according to the aforementioned formula, so that the voltage across terminals 65 is proportional to $\sin \theta$. These trigonometric function voltages of the input angle $\theta$ may be used directly as voltage inputs to an electric calculator, or may be impressed on a motor for obtaining corresponding displacements to indicate the function of the angle, or drive additional computing mechanism, or the like.

Figure 6 schematically illustrates a potentiometer adapted for use as an electric cam, wherein the potentiometer 10' is provided with intermediate taps 67, 68, 69, 70, etc., on the winding 14', and additional auxiliary resistors 71, 72, 73, 74, etc., are electrically connected to and between the taps in order to obtain predetermined voltage drops between adjacent taps. For example, auxiliary resistor 71 is electrically connected across end tap 15' and intermediate tap 67 on the winding 14', while auxiliary resistor 72 is electrically connected across the intermediate taps 67 and 68 on the winding 14', with the resistance of each of the auxiliary resistors 71 and 72 determining the joint resistance between the winding taps to which the auxiliary resistor is connected. A constant voltage electric supply is connected to the end taps 15', 16', on the winding 14' of the potentiometer 10', and the output voltage of the potentiometer is the voltage across end tap 15' on the winding 14' and movable contact 17' moved through angular angle $\theta$ by a shaft 75, or the like.

The voltage drop in the winding 14' of the potentiometer between adjacent winding taps of auxiliary resistors is linear with displacement, and the slope of each portion of the voltage drop versus angular displacement curve, is predetermined by the voltage drop between the adjacent auxiliary resistor taps. This is illustrated in Fig. 7, where the position of any point on the cam is fixed by the value of abscissa and ordinate, and where the abscissa is the angular displacement of movable contact 17' from its zero position on end tap 15' of the potentiometer 10', and the ordinate is the output voltage of the potentiometer. It follows that with correctly chosen values of resistance for auxiliary resistors 71, 72, 73, 74, etc., and a sufficient number of intermediate winding taps, the potentiometer 10' will approximate a mechanical cam, whereby virtually any desired curve may be obtained as compared to the straight line curve obtained with potentiometer 10 in Fig. 1, for example, where the voltage output is always directly proportional to the displacement of the movable contact from its zero position. Thus, one or more of the non-linear output potentiometers of Fig. 6 may be employed in one of the foregoing arrangements to achieve various results, or for actuating a motor to obtain a displacement corresponding to that produced by an equivalent mechanical cam, or the like.

Although certain preferred embodiments of the invention are illustrated and described herein, it is to be understood that the invention is not limited thereby, but is susceptible of changes in form and detail within the scope of the appended claims.

I claim:

1. In an electric computer for making calculations involving a plurality of input quantities, the combination of a source of constant voltage, means for modifying said voltage as a function of a quantity, a potentiometer having a movable contact engaging a conductor having input terminals and a center tap, an electrical circuit for applying said modified voltage to the input terminals of said potentiometer conductor, means for adjusting the movable contact of said potentiometer on opposite sides of said center tap in accordance with positive and negative values, respectively, of a quantity, whereby the voltage output across the center tap and movable contact of said potentiometer is a function of an algebraic combination of said quantities, and motive means responsive to the output of said potentiometer for indicating the said combination of said quantities.

2. In an electric computer for making calculations involving a plurality of input quantities, the combination of a potentiometer having a movable contact and a conductor having input terminals and a center tap, a source of constant voltage connected to the input terminals of said potentiometer conductor, means for adjusting the movable contact of said potentiometer on opposite sides of the center tap thereof in accordance with positive and negative values, respectively, of a first quantity, a second potentiometer having a movable contact and a conductor having input terminals and a center tap, an electrical circuit including the movable contact and center tap of said first potentiometer for impressing the output of said first potentiometer on the input terminals of the conductor of said second potentiometer, means for adjusting the movable contact of said second potentiometer on opposite sides of the center tap thereof in accordance with positive and negative values, respectively, of a second quantity, whereby the voltage output across the center tap and movable contact of said second potentiometer is a function of an algebraic combination of said first and second quantities, and motive means responsive to the voltage output of said second potentiometer for displacing an indicating element a degree commensurate with said output.

3. In an electric computer for making calculations involving a plurality of input quantities, the combination of a potentiometer having a movable contact and a conductor having input terminals and a center tap, a source of constant voltage connected to the input terminals of said potentiometer conductor, means for adjusting the movable contact of said potentiometer on opposite sides of the center tap thereof in accordance with positive and negative values, respectively, of a first quantity, a second potentiometer having a movable contact and a conductor having input terminals and a center tap, an electrical circuit including the movable contact and center tap of said first potentiometer for impressing the output of said first potentiometer on the input terminals of the conductor of said second potentiometer, means for adjusting the movable contact of said second potentiometer on opposite sides of the center tap thereof in accordance with positive and negative values, respectively, of a second quantity, whereby the voltage output across the center tap and movable contact of said second potentiometer is a function of an algebraic combination of said first and second quantities, means for providing a control voltage, means for adjusting the value and sign of said control voltage, an electrical circuit for combining said control voltage and the voltage output of said second potentiometer, and motive means responsive to said combined voltages for indicating said combined quantities and for actuating said control voltage adjusting means to deenergize said motive means.

4. In an electric computer for making calculations involving a plurality of input quantities, the combination of a potentiometer having a movable contact and a conductor having input terminals and a center tap, a source of constant voltage connected to the input terminals of said potentiometer conductor, means for adjusting the movable contact of said potentiometer on opposite sides of the center tap thereof in accordance with positive and negative values, respectively, of a first quantity, a second potentiometer having a movable contact and a conductor having input terminals and a center tap, an electrical circuit including the movable contact and center tap of said first potentiometer for impressing the output of said first potentiometer on the input terminals of the conductor of said second potentiometer, means for adjusting the movable contact of said second potentiometer on opposite sides of the center tap thereof in accordance with positive and negative values, serpectively, of a second quantity, whereby the voltage output across the center tap and movable contact of said second potentiometer is a function of an algebraic combination of said first and second quantities, a third potentiometer having a movable contact and a conductor connected to said source of constant voltage, an electrical circuit including the movable contacts of said second and third potentiometers for combining the voltage outputs of said second and third potentiometers, and motive means responsive to said combined voltage outputs for indicating said combined first and second quantities and for displacing the movable contact of said third potentiometer to deenergize said motive means.

5. In an electric computer for making calculations involving a plurality of input quantities, the combination of a potentiometer having a movable contact and a conductor having input terminals and a center tap, a source of constant voltage connected to the input terminals of said potentiometer conductor, means for adjusting the movable contact of said potentiometer on opposite sides of the center tap thereof in accordance with positive and negative values, respectively, of a first quantity, a second potentiometer having a movable contact and conductor having input terminals and a center tap, means for adjusting the movable contact of said second potentiometer on opposite sides of the center tap thereof in accordance with positive and negative values, respectively, of a second quantity, an electrical circuit including the movable contact and center tap of said first potentiometer for impressing the output of said first potentiometer on the input terminals of the conductor of said second potentiometer, whereby the output across the center tap and movable contact of said second potentiometer is a function of an algebraic combination of said first and second quantities, a third potentiometer having a movable contact and a conductor having a center tap and input terminals, connections between said input terminals of the third potentiometer and said source of constant voltage, an electrical circuit including the movable contacts of said second and third potentiometers for combining the voltage outputs thereof, and motive means responsive to said combined voltages for indicating said combined second and third quantities and for displacing the movable contact of said second potentiometer relatively to the center tap thereof to deenergize said motive means.

References Cited in the file of this patent

UNITED STATES PATENTS

| Number | Name | Date |
|---|---|---|
| 2,194,986 | Nessell | Mar. 26, 1940 |
| 2,273,275 | Kutzler | Feb. 17, 1942 |

FOREIGN PATENTS

| Number | Country | Date |
|---|---|---|
| 164,765 | Great Britain | June 23, 1921 |
| 218,548 | Great Britain | July 10, 1924 |
| 365,216 | Italy | Nov. 26, 1938 |
| 458,274 | Great Britain | July 5, 1935 |
| 849,907 | France | Aug. 28, 1939 |